(12) United States Patent
Jones

(10) Patent No.: US 6,915,896 B2
(45) Date of Patent: Jul. 12, 2005

(54) CLEANING DRAIN APPARATUS FOR AN AUGER ASSEMBLY

(75) Inventor: Stanley O. Jones, Vienna, IL (US)

(73) Assignee: Dippin' Dots, Inc., Paducah, KY (US)

( * ) Notice: Subject to any disclaimer, the term of this patent is extended or adjusted under 35 U.S.C. 154(b) by 139 days.

(21) Appl. No.: 10/374,391

(22) Filed: Feb. 25, 2003

(65) Prior Publication Data

US 2004/0163932 A1 Aug. 26, 2004

(51) Int. Cl.$^7$ ............................................. B65G 33/32
(52) U.S. Cl. ....................... 198/672; 198/671; 414/218
(58) Field of Search ............................. 198/672, 671, 198/494; 414/218, 326, 526; 137/245, 571, 572, 15.01, 15.04, 15.05, 312, 583

(56) References Cited

U.S. PATENT DOCUMENTS

| | | | | | |
|---|---|---|---|---|---|
| 1,467,615 | A | * | 9/1923 | Fairbanks | 137/242 |
| 2,059,733 | A | * | 11/1936 | Heisser | 137/240 |
| 2,263,259 | A | * | 11/1941 | Boosey | 210/314 |
| 2,545,140 | A | * | 3/1951 | Escher | 198/666 |
| 3,889,701 | A | * | 6/1975 | Mueller | 137/1 |
| 3,896,923 | A | * | 7/1975 | Griffith | 198/661 |
| 3,955,596 | A | * | 5/1976 | Diaz | 137/527 |
| 4,109,966 | A | * | 8/1978 | Boyhont et al. | 406/60 |
| 4,114,427 | A | * | 9/1978 | Iguchi et al. | 73/53.04 |
| 4,159,721 | A | * | 7/1979 | Horter | 137/317 |
| 4,218,786 | A | * | 8/1980 | Taglarino | 4/679 |
| 4,220,242 | A | * | 9/1980 | Forsberg | 198/666 |
| 4,228,802 | A | * | 10/1980 | Trott | 604/105 |
| 4,235,187 | A | * | 11/1980 | Mirza | 118/58 |
| 4,344,361 | A | * | 8/1982 | MacPhee et al. | 101/425 |
| 4,380,284 | A | * | 4/1983 | Ito et al. | 198/494 |
| 4,401,402 | A | * | 8/1983 | Casperson | 414/218 |
| 4,408,944 | A | * | 10/1983 | Christian | 414/216 |
| 4,446,651 | A | * | 5/1984 | Spitz et al. | 47/10 |
| 4,506,851 | A | * | 3/1985 | Gupta et al. | 244/129.1 |
| 4,594,739 | A | * | 6/1986 | Watts et al. | 4/287 |
| 4,613,275 | A | * | 9/1986 | Karlowsky | 414/489 |
| 4,738,687 | A | * | 4/1988 | Smieskol et al. | 48/197 R |
| 4,957,123 | A | * | 9/1990 | McHugh | 134/167 C |
| 5,075,905 | A | * | 12/1991 | Rutherford | 137/247.51 |
| 5,085,244 | A | * | 2/1992 | Funk | 137/240 |
| 5,089,123 | A | * | 2/1992 | DeVoe | 210/189 |
| 5,154,825 | A | * | 10/1992 | Kupka | 210/327 |
| 5,203,614 | A | * | 4/1993 | Robbins et al. | 299/33 |
| 5,318,444 | A | * | 6/1994 | Kuzub et al. | 414/326 |
| 5,573,660 | A | * | 11/1996 | Eicker et al. | 210/162 |
| 5,657,852 | A | * | 8/1997 | Bavington | 198/494 |
| 5,669,531 | A | * | 9/1997 | Hagemeyer | 222/153.14 |
| 5,722,529 | A | * | 3/1998 | Manjunath et al. | 198/671 |
| 5,798,038 | A | * | 8/1998 | Huber | 210/154 |
| 5,988,357 | A | * | 11/1999 | Memory et al. | 198/671 |
| 6,041,611 | A | * | 3/2000 | Palmer | 62/286 |
| 6,068,108 | A | * | 5/2000 | Dudley | 198/671 |
| 6,182,677 | B1 | * | 2/2001 | Pignataro | 137/15.05 |
| 6,244,388 | B1 | * | 6/2001 | Yun | 184/63 |
| 6,261,050 | B1 | * | 7/2001 | Kuhns | 414/526 |
| 6,403,042 | B1 | * | 6/2002 | Goeldner | 422/297 |
| 6,427,458 | B1 | * | 8/2002 | Fowler | 62/150 |
| 6,584,995 | B2 | * | 7/2003 | Kimbrough et al. | 137/240 |
| 6,659,113 | B2 | * | 12/2003 | Wilcher | 134/65 |
| 2002/0129616 | A1 | | 9/2002 | Jones | |

* cited by examiner

Primary Examiner—Eileen D. Lillis
Assistant Examiner—Rashmi Sharma
(74) Attorney, Agent, or Firm—Stockwell and Assoc.

(57) ABSTRACT

A drain apparatus for the intake end of an auger is disclosed. The drain apparatus comprises a bearing with radial arms, a cover with a cover portion, a drain and a drain cap for removably closing the opening of the drain. The drain apparatus facilitates a clean in place procedure.

6 Claims, 2 Drawing Sheets

CLEANING DRAIN APPARATUS FOR AN AUGER ASSEMBLY

CROSS REFERENCE TO RELATED APPLICATIONS

Not Applicable

STATEMENT REGARDING FEDERALLY SPONSORED RESEARCH OR DEVELOPMENT

Not Applicable

INVENTORS

Stanley O. Jones

FIELD OF THE INVENTION

The present invention relates generally to auger transport apparatus, and more specifically to a cleaning drain apparatus for an auger assembly.

BACKGROUND OF THE INVENTION

This invention relates generally to the field of auger-type conveyors (hereinafter "augers") and more specifically to an improved cleaning drain apparatus for an auger. Augers are well known in the art, examples of which are disclosed in U.S. Pat. Nos. 2,507,873; 2,541,984; 3,057,522; 4,613,275 and 5,009,254, the disclosures of which are hereby incorporated herein by reference. Augers are known to be an efficient means of unloading particulate or semi-fluid materials. By way of example, augers are useful to unload grain, beaded ice cream, and popcorn, U.S. Pat. Nos. 5,800,116; 5,126,156 and 5,657,684, respectively, the disclosures of which hereby incorporated herein by reference.

A typical auger comprises a helical flight or screw type conveyor enclosed within a conduit. Proximal to one end of the conduit is an outlet for expelling material moved by the auger. An intake end is disposed at the opposite end of the conduit. Proximal to the intake end of the conduit is an intake in the form of an upwardly disposed neck. The intake end of the conduit is generally disposed below the outlet end of the conduit. Material is fed to the intake by gravity. Rotation of the screw type conveyor draws material upwards from the bottom of the transport mechanism to the top of the transport mechanism, where it is subsequently discharged from the outlet into a receptacle.

U.S. patent application Ser. No. 2002/0129616, the disclosures of which are hereby incorporated herein by reference, discloses an auger comprising improvements that facilitate cleaning in place. The auger comprises a novel drain line at the outlet end to provide a port of exit for wash and rinse solutions. In addition, the auger assembly is configured with a faceplate that may be removed to permit the removal of debris that may accumulate near the bottom of the auger. Despite these improvements, deficiencies in the cleaning system are still encountered. First, because the flow of cleaning solutions around the outlet end is not optimal, cleaning in place does not always provide the desired degree of cleaning. Second, because the faceplate supports the auger bearing at the bottom of the auger, removal of the faceplate to clean the outlet end destabilizes the screw type conveyor, making it vulnerable to damage. There remains a need in the art for improvements in auger conveyors that improve cleaning in place, and which allow access to the inside of the auger bottom for cleaning purposes without destabilizing the screw type conveyor.

BRIEF SUMMARY OF THE INVENTION

The primary object of the invention is to provide a drain line apparatus for an auger assembly that provides improved flow characteristics for wash and rinse solutions to facilitate cleaning in place.

Another object of the invention is to provide a bearing support for an auger assembly that permits wash and rinse solutions to flow freely around the bearing support.

Another object of the invention is to provide a bearing support for an auger assembly that is stable when it is exposed for cleaning.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a drain line apparatus for an auger assembly comprising a rounded cover part, a drain line part, and a means for closing the drain line part.

In accordance with a preferred embodiment of the invention, there is disclosed a bearing support for an auger assembly comprising radial arms that attach a bearing to the conduit of the auger.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
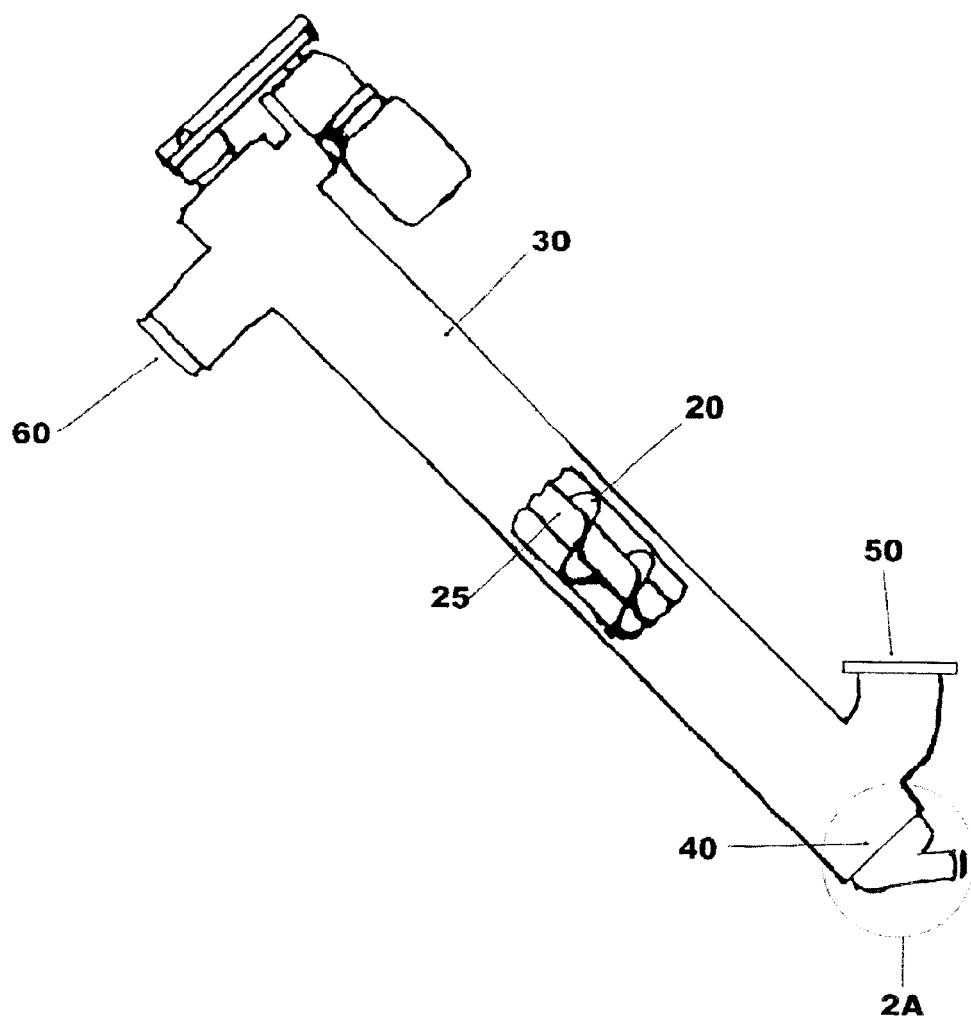
FIG. 1 is a side view of an auger assembly incorporating the present invention.

FIG. 1 shows a side view of an auger assembly 10 of the present invention. The auger comprises a screw type conveyor 20 coupled to and extending around a rotatable axle 25 enclosed within a conduit 30. Near an intake end 40 of the conduit 30 is an upwardly disposed intake 50. The intake 50 receives material, such as frozen beads of ice cream or other particulate material, which is fed to the intake 50 by gravity. When the axle 25 is rotated around its axis or rotation, the coupled screw type conveyor 20 rotates around the same axis, drawing material from the intake 50 through the conduit 30, and conveying it to the outlet 60, where the material is subsequently discharged. The screw type conveyor 20, axle 25, conduit 30, intake 50 and outlet 60 are constructed of materials customarily used in the art, such as stainless steel.

Figure 2A:
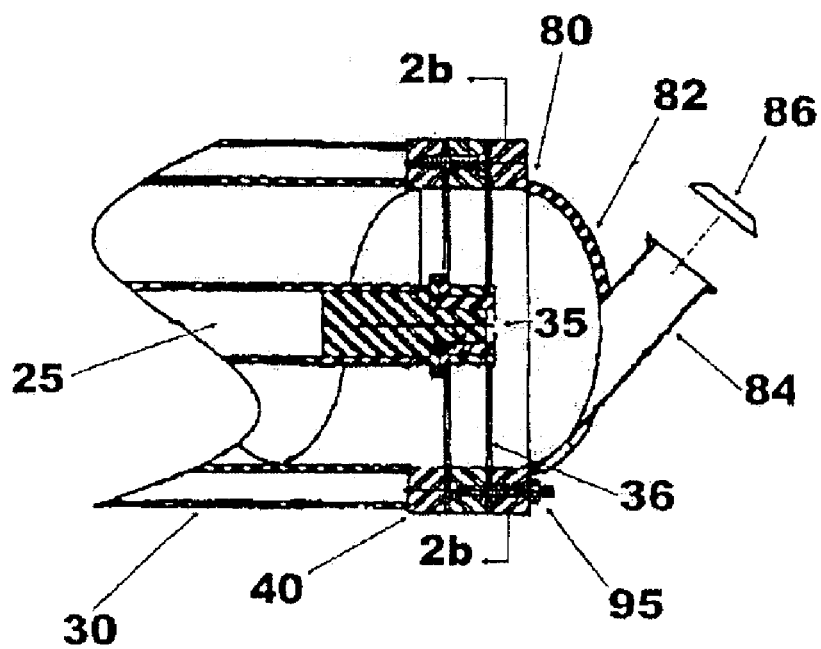
FIG. 2a is a sectional view of the intake end of the auger assembly in FIG. 1.

FIG. 2a shows that the axle 25 is positioned within a lower bearing 35, which permits rotation of the axle 25 relative to the conduit 30. The lower bearing 35 is coupled to a lower bearing support 36.

Figure 2B:
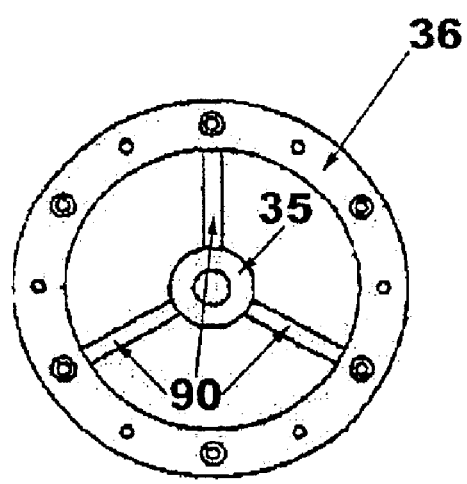
FIG. 2b is a sectional view of the intake end of the auger assembly taken along section line 2B—2B in FIG. 1.

FIG. 2b illustrates a cross section through the intake end 40 of the conduit 30 at the level of the lower bearing 35. In the present embodiment, three arms 90 of the bearing support 36 rigidly support the bearing 35 such that axle 25 remains in the center of the conduit 30.

Returning to FIG. 2a, a cover 80 (also referred to herein as a "cover structure") closes the intake end 40 of the conduit 30, by attaching to the bearing support 36. By way of example, the cover 80 may be constructed from stainless steel, although other construction materials are suitable. In the embodiment shown, the cover 80 is secured to the bearing support 36 with bolts 95, which, by way of example, may be constructed of brass, with a gasket 96 interposed between the cover 80, which gasket 96, by way of example, may be constructed of Teflon, and the bearing support 36. The cover 80 comprises a cover part 82, a drain line 84, and a means for closing the drain line 84, such as cap 86, or alternatively a valve or stopper. The cover part 82 provides a chamber below the bearing 35 and bearing support 36 into which wash and rinse solutions can flow, providing an optimal cleaning environment. In the preferred embodiment, the cover part 82 is substantially rounded or hemispherical, which has been observed to provide the best results when cleaning in place.

While the auger assembly 10 is in operation conveying material, the drain line is closed, for example by securely but removably attaching a drain cap 86 to the drain line 84. In one embodiment, the drain cap 86 is removably attached to the drain 84 with sanitary Tri-Clamp fittings. For example, Tri-Clamp ferrule P/N L14AM7 may be used for the drain line 84. In this embodiment, the drain cap 86 is Tri-Clamp solid end cap P/N 16AMP. A Tri-Clamp gasket P/N 40MP-UW is inserted between the drain line 84 and the drain cap 86, and Tri-Clamp single pin heavy duty clamp P/N 13MHHM removably secures the drain cap 86 to the drain 84.

Debris has a tendency to fall from material conveyed by the auger assembly 10, accumulating around the bearing 35 and bearing support 36. In the prior art, this debris could be effectively cleaned only by dismantling the intake end 40 of the auger assembly 10 followed by flushing with cleaners and disinfectants. However, the fluid flow forces generated near and around the bearing 35 were not sufficient to dislodge the debris. In the present invention, the auger assembly 10 may be readily cleaned without dismantling. To clean the auger assembly 10, the drain line 84 is opened, and wash and rinse solutions and disinfectants are passed into the conduit 30 through the outlet 60 and/or the intake 50. Alternatively, a nozzle may be provided at the outlet end of the auger assembly for accepting wash and rinse solutions.

The wash and rinse solutions and disinfectants flow downward against the flighting of the screw type conveyor, passing freely between the arms 90 of the bearing support 36, and exiting from the drain 84. The currents or fluid flow forces created by the cleaners and disinfectants, flowing past the bearing 35, between the arms 90, between the bearing support 36 and cover structure 80 and exiting through the drain 84, effectively remove debris from the bearing 35 and the arms 90, allowing the auger assembly 10 to be cleaned without dismantling. When removal of the cover structure 80 is required to allow inspection of the interior of the intake end 40, the bearing 35 is advantageously attached to the conduit 30, allowing removal of the cover structure 80 without destabilizing the screw type conveyor 20.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An auger assembly comprising: a conduit forming a channel from an intake end to any outlet end; a screw-type conveyor disposed within the conduit; an outlet, and a cleaning drain apparatus disposed near the intake end of the conduit, said cleaning drain apparatus comprising a bearing proximal to the intake end, said bearing aligned with the central axis of the conduit by a bearing support, said bearing support comprising radial arms, said radial arms rigidly attaching said bearing to said conduit; a cover structure closing the intake end of said conduit, said cover structure comprising a cover portion, a drain line and a means for reversibly closing said drain line, and wherein said cover structure forms a chamber below said bearing and said bearing support.

2. An auger assembly as in claim 1 wherein said means for reversibly closing said drain line comprises a cap.

3. An auger assembly as in claim 1 wherein said means for reversibly closing said drain line comprises a stopper.

4. An auger assembly as in claim 1 wherein said means for reversibly closing said drain line comprises a valve.

5. An auger assembly as in claim 1 wherein said cover portion is rounded.

6. An auger assembly as claimed in claim 1 wherein said bearing support comprises three radial arms.

* * * * *